May 19, 1970  W. HAACK  3,512,596
SELF-REBALANCING WEIGHING APPARATUS
Filed May 22, 1969  6 Sheets-Sheet 1

INVENTOR
Werner Haack
BY
Norris & Bateman
ATTORNEYS

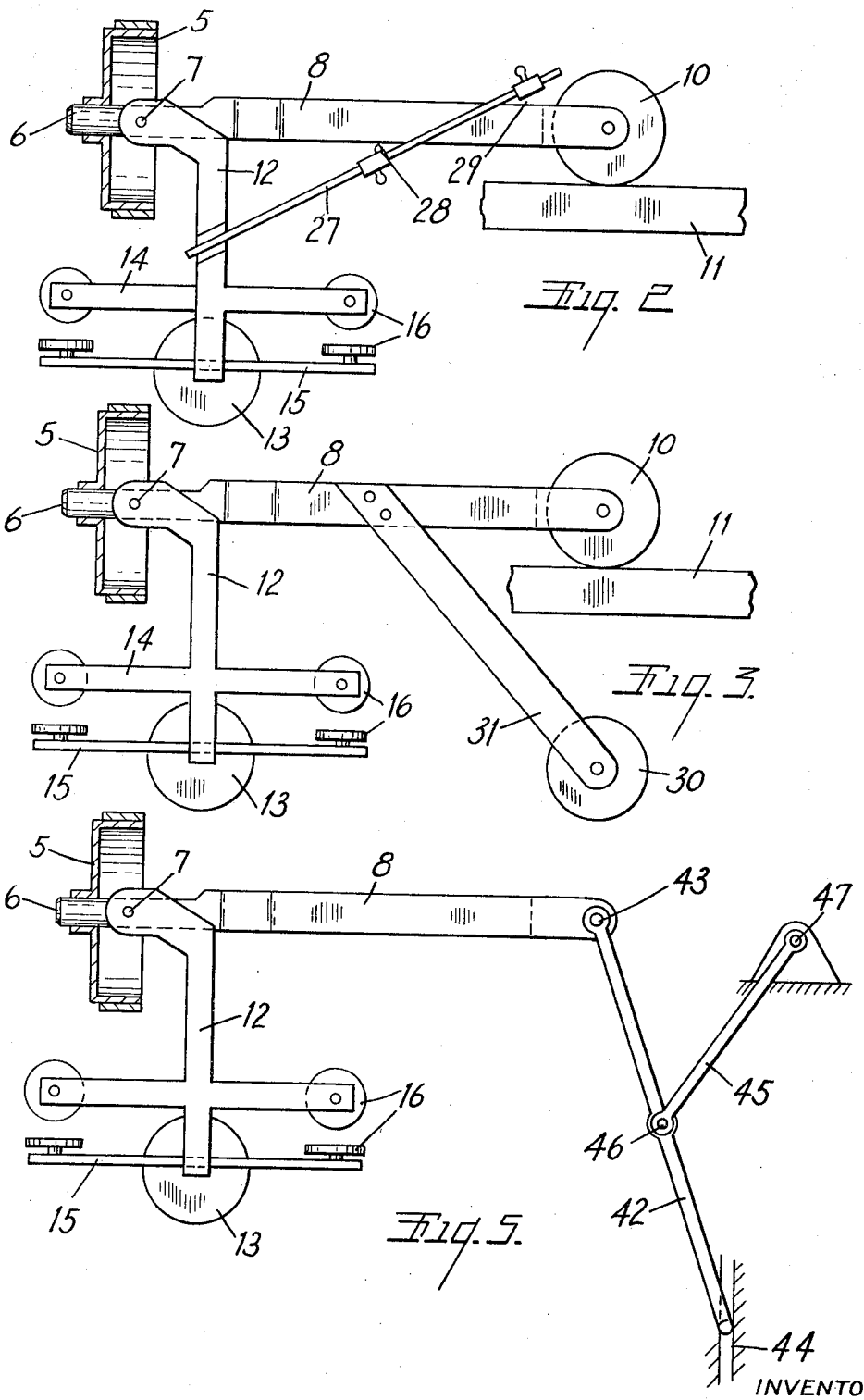

INVENTOR
Werner Haack
BY Norris & Bateman
ATTORNEYS

INVENTOR
WERNER HAACK

INVENTOR.
WERNER HAACK
BY
Norris & Bateman
ATTORNEYS

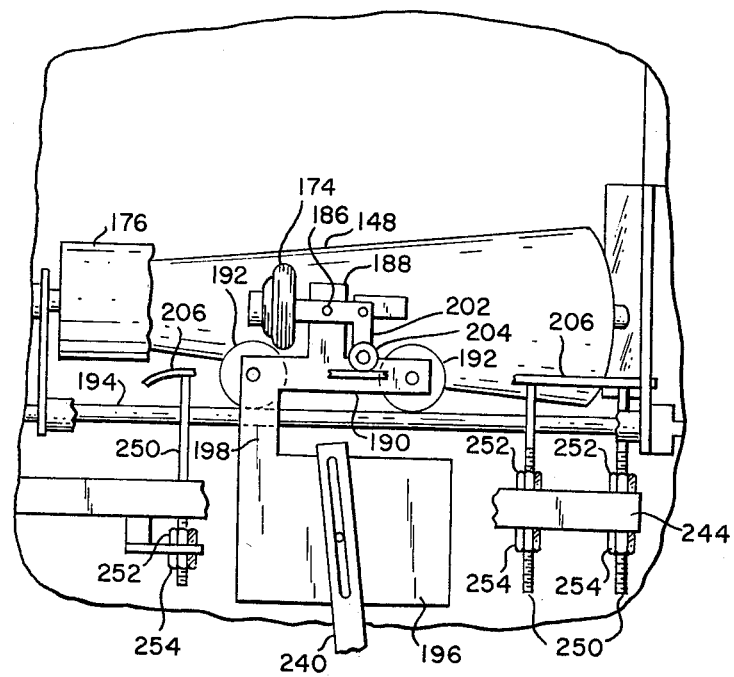
FIG. 9
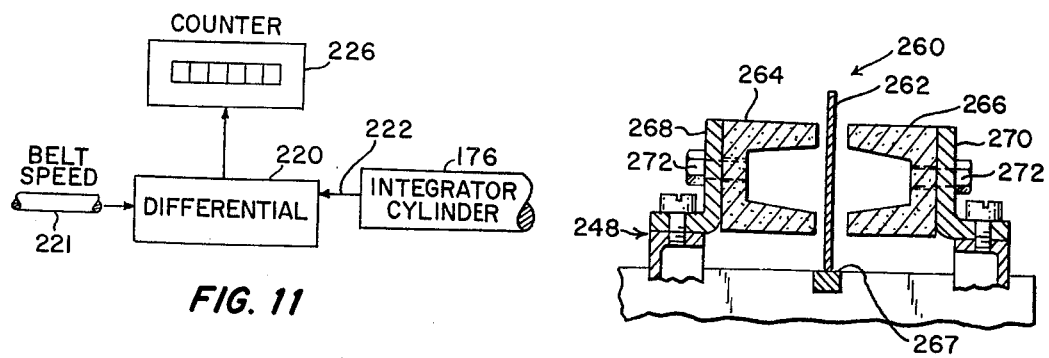
FIG. 11
FIG. 10
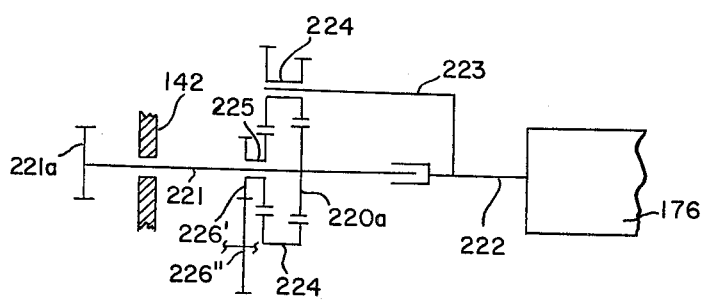
FIG. 8A
INVENTOR.
WERNER HAACK

United States Patent Office 3,512,596
Patented May 19, 1970

3,512,596
SELF-REBALANCING WEIGHING APPARATUS
Werner Haack, Chur, Switzerland, assignor to Howe Richardson Scale Company, Clifton, N.J., a corporation of Delaware
Continuation-in-part of application Ser. No. 525,510, Feb. 7, 1966. This application May 22, 1969, Ser. No. 826,996
Claims priority, application Germany, Feb. 13, 1965, H 55,154
Int. Cl. G01g 7/00, 11/14, 23/10
U.S. Cl. 177—213
19 Claims

ABSTRACT OF THE DISCLOSURE

A weighing apparatus comprising a load-supporting, pivotally mounted weigh beam structure rotatably carrying a continuously driven member which frictionally engages a friction wheel to impart rotation thereto. The friction wheel is supported for longitudinal movement on a fixed guide rail so that when the beam structure is pivoted away from its balanced position, the rotational axis of the driven member inclines relative to that of the friction wheel with the result that a force component, which is derived from the inclined frictional rotative interengagement between the driven member and the friction wheel, displaces the friction wheel longitudinally along its axis and the roller periphery. A counter-weight operatively connected to the friction wheel is moved in a beam-balanced direction along the beam structure as the wheel is longitudinally displaced by the inclination of the driven member.

RELATED APPLICATIONS

This application is a continuation-in-part of my application Ser. No. 824,727 filed Apr. 29, 1969, and now abondoned, for Mechanical Balancing Apparatus, which application, is, in turn, a continuation of my now abandoned application Ser. No. 525,510 filed on Feb. 7, 1966 for Mechanical Balancing Apparatus.

FIELD OF INVENTION

This invention relates to weighing apparatus and particularly to a mechanism for automatically restoring a displaceable, load-supporting structure to a null position.

BACKGROUND OF INVENTION

In the manufacture of mechanical balances at the present time, the so-called inclination pendulum is predominantly employed as weighing mechanism. In the last few decades, the inclination pendulum has supplanted the long-known balance weight beam to an increasing extent. The main reason for this resides in the fact that weighing with balance weight means has so far had to be carried out manually, whereas the inclination pendulum does not require manual operation and performs the weighing process automatically. It is understandable that great importance has been attached to this automatic weighing process by operators of balances. As compared with the weight beam, however, there are also disadvantages attaching to the pendulum system, the most important of which is probably the necessary weighing travel required in all the parts of the balance. This weighing travel causes difficulties again and again in the observance of the accuracy of weighing officially prescribed by law and often makes it necessary to incur considerable expenditure on design.

It is therefore not surprising that attempts have been made again and again to render automatic the weighing process in a balance having a balance weight beam. In spite of intensive efforts, no fully practicable solution has been found hitherto, because owing to the extremely small forces acting at the weigh beam only electro-mechanical or electronic control systems have been used for displacing the balance weight, which is generally effected by motor. Such control systems, however, have proved too complicated and costly, so that in spite of its basic simplicity and high accuracy the balance weight beam finds only little use today.

The problem of the invention consists in not only applying to the beam the external energy for automatically shifting the balance weight, by means which are simple and absolutely reliable in operation, but also controlling it so precisely that the high accuracy of the weighing system is preserved and in addition a short weighing time, preferably which is as short as that obtained with pendulum balances, is achieved.

SUMMARY AND OBJECTS OF INVENTION

In the balance according to the invention an adjusting gear, preferably a friction gear, is provided, this gear having a driving part which runs continuously during balancing and a driven part which transmits adjusting forces of different magnitudes in different directions depending upon its position, a connection to the balance also being provided, for example a control linkage, which brings to zero the adjusting forces in the state of equilibrium.

Adjusting gears which transmit forces of different magnitudes in different directions, depending upon the position of the driven and driving parts in relation to one another, are known per se. The invention resides in the fact that the different positions of the driving and driven parts in relation to one another are used to shift a balance weight in one direction or the other at various high or low speeds. In order to give the balance an exact position of equilibrium or zero position, there is provided in addition a connection which so adjusts the position of the driving and driven parts of the adjusting gear with respect to one another that in the state of equilibrium no adjusting forces are transmitted or these adjusting forces are reduced to zero. As a result of this measure, an aperiodic movement of the balance weight into the position of equilibrium is possible. In known constructions, in which, for example, the balance weight is shifted by motor using an on-off control, supplementary damping means must also be provided in order to compensate for the changing of position of the gear parts. Furthermore, these known constructions have the drawbacks that electrical contacts are required, that a relatively great force is necessary in order to bring the moving masses to rest and that cost of production is high. Also these constructions take up a lot of room and are undesirably heavy.

Control of the drift of the balance may be effected by a control linkage, but any other possibilities may also be applied for this purpose. A preferred construction consists in that the adjusting gear, in the form of a friction gear, has a driven wheel in constant engagement with a rotating roller which is mounted together with its drive on a frame which also carries the load arm and can pivot about the bearing point of a supporting knife-edge on a fixed support.

A further simplification is obtained in that a friction wheel which itself forms part of the balance weight may serve to control the latter. When the friction wheel itself forms part of the balance weight, the use of a number of otherwise indispensable auxiliary parts may be avoided. In addition, rapid response is ensured, since the shifting of the friction wheel serves directly to balance the weight.

Another important feature is that the driven friction wheel may be provided with an adjusting arm the free end of which is mounted to be reciprocable along a stationary guide rail, preferably by means of a pin and a guide roller.

A construction such as this permits the rapid and precise adjustment of the friction gear and thereby of the balance weight, in that with a change in the load to be weighed a rotation occurs between the driving roller and the driven wheel. The direction of rotation is such that the change in the load is counteracted in each case by shifting of the balance weight. The free end of the adjusting arm rolls to and fro on the fixed guide rail according to the load to be weighed, so that the balance weight is adjusted accordingly.

According to a further feature of the invention, it is also provided that the bearing pin of the driven friction wheel be attached pivotally to one end of an angular supporting element, the other end of which carries a counterweight and also bearing arms, the guide rollers of which rest on a guide bar which is a part of the frame.

Thus, on adjustment of the balance weight, the bearing pin presses the driven wheel against the driving roller and at the same time carries it along the latter substantially parallel to its axis. Hence, the driven wheel, the guide therefor and the pivoting or swiveling mechanism operate together as a balance weight.

It is moreover advantageous that on the load arm there may be provided a knife-edge on which rests a load stirrup which carries the load to be weighed. This construction ensures simple application of the load, which acts on the frame, the latter projecting beyond the supporting knife-edge.

A still further feature of the invention is characterized in that stabilizing means are provided. This measure serves to limit the process of oscillation into the position of equilibrium. In practice, the duration allowed for oscillation requires to be variable within wide limits. Various possibilities offer themselves for the purpose of effecting stabilization.

According to one construction, a substantially vertically adjustable auxiliary weight is mounted on the load arm. By means of this measure, which is known per se, the vertical position of the center of gravity, that is the stability, is also produced for the automatic balance weight beam and is rendered adjustable.

A spring acting between stop jaws and the angular supporting element may also be provided for damping the oscillation process.

This is only one of the possibilities for making use of the novel structural parts, which effect the shifting process, for damping the oscillation process. The stop jaws restricting the deflection of the adjusting arm, the angular supporting element and the spring may be disposed in a constructional zone of the weigh beam such that it is possible to produce particularly effective stabilization.

A further possibility consists in that a pendulum piece is attached to the adjusting arm by means of a rod.

Such a pendulum piece also has a stabilizing action both when the load is increased and when the load is reduced. At the same time, by varying the size of the pendulum piece and its distance from the guide roller, the stabilizing effect can be adapted within wide limits to particular practical requirements.

A further feature of the invention is characterized in that simple mechanical parts, for example a push rod, a cord, a steel strip or the like are arranged on the pin of the adjusting arm for operating an indicating means or a printing device.

In the position of equilibrium, the weight of the load corresponds to the position of the balance weight, which is formed by the combination of parts shifted with the friction wheel. The longitudinal scales which have heretofore been customary in manually operated weigh beams for reading the weight may also be employed, in essence, in the above-described automatically operating balance weight beam. In order to give full effect to the automation however, recourse will generally be had to modern weight indicating means of various known kinds, which operate either mechanically optically or electrically and to which the position of the balance weight is communicated in some convenient way. The adjusting arm pin for the guide roller offers itself as being particularly advantageous for picking up this position of the balancing weight, because this part only performs horizontal movements. The connection thereto of simple mechanical parts, for example a push rod, a cord or a steel strip, for operating a scale pointer or optical or electrical indicating devices is readily possible. Moreover, as is known, it is possible to take from such a friction gear at the pin a large output force which can be used for controlling follow-up devices, for example for producing weight records.

Although the invention has been elaborated above primarily with reference to a friction gear with one roller and one friction wheel, the invention is not to be considered limited to such gears. On the contrary, the invention may be carried out, generally in the same way, with the most diverse gears. At the same time, both the shape of the gears and the number thereof may vary. The cylindrical shape may be replaced by a crowned or conical one; in addition, instead of one roller, a plurality of rollers may also be employed.

The invention is therefore also intended to cover the use of computing gears, which are built upon the basis of roller gears and when employed in an automatic weigh beam enable the conversion of the analogue weight value into digital form to be effected easily and rapidly, as also the supply of the weight value from the weigh beam for other computing operations which are inherent in such gears. The mechanical integrating gears which are frequently employed in the manufacture of conveyor-belt weighing devices deserve special mention. Thus, a further feature of the invention provides that a computing gear be used, in particular a double roller gear with two friction wheels and a guide arrangement.

As a further development of this further feature, a guide arrangement may be formed in that to the friction-wheel control point there is pivotally connected one end of a control rod the other end of which is guided rectilinearly and to which a pivotally mounted supporting rod is articulated, the fixed bearing point being located laterally adjacent the rollers of the double gear.

According to a preferred embodiment of this invention the load-supporting pivotally mounted balance beam carries the rotatable drive member which frictionally engages the driven friction wheel to drive the friction wheel longitudinally along its periphery for re-balancing the beam when the beam moves away from its balanced position by virtue of a change in the loading forces applied thereto. In this preferred embodiment, a motion-transmitting lever system is operatively connected to the balance beam and carries a lever assembly which forms a weighbridge or suspension to support the weighing length of a load-supporting, travelling conveyor belt in a conveyor scale. When variations in the weight of the load applied to the conveyor belt weighing length displaces the weighbridge away from an initially adjusted null position, the previously mentioned balance beam is pivoted to impart displacement to the counterweight on the beam for re-balancing the beam. As a result of re-balancing the beam the weighbridge and, consequently, the conveyor belt weighing length are promptly restored to their initial null positions. This feature of the invention is of particular importance because it substantially nullifies the objectionable, accuracy-impairing belt tension force components which cause the measured weight to deviate from the true weight of the load being weighed.

The preferred construction of the balancing mechanism according to this invention is, in addition to the previously explained aspects, particularly advantageous in that it may readily be employed as a part of a mechanical integrator of the wheel and cylinder or disc type for totalizing the weight of material on the travelling conveyor belt.

DESCRIPTION OF DRAWINGS

FIG. 2 shows a friction gear with a stabilizing spring and deflection limiting means;

FIG. 3 illustrates a friction gear with a pendulum piece;

FIG. 5 illustrates a suitable guide arrangement for the friction gear of such a computing gear;

FIG. 8A is a diagrammatic view showing the differential mechanism in a preferred embodiment;

FIG. 9 is a section taken substantially along lines 9—9 of FIG. 8;

FIG. 10 is a fragmentary section taken substantially along lines 10—10 of FIG. 8; and FIG. 11 is a fragmentary schematic view illustrating a differential gear connection between the integrator and the counter.

According to FIGS. 1A to 1C, a cylinder or roller 2 is mounted to be freely rotatable about its axis in frame 1. This roller is set in constant rotation by a motor 3, at least during the weighing operation, either directly or by way of a toothed wheel or chain drive 4. A friction wheel 5 is in constant contact with the roller 2. This friction wheel 5 is mounted on the shaft 6 which in turn is arranged so that it can swivel on a bearing pin 7. Fixedly connected to the shaft 6 is an arm 8, which carries at its free end a pin 9 on which a ball bearing or a guide roller 10 is rotatably mounted. The reference 11 indicates a guide rail which, independently of all the other parts, is fixedly mounted on suitable supports (not shown). In practical operation, the part 10 rolls to and fro on this guide rail according to the load to be weighed. The combined effect of weight 13 and the arms of support 12 described below acting on bearing pin 7 urges the friction wheel 5 against the roller 2. Bearing pin 7 at the same time carries wheel 5 along the roller as parallel as possible to the axis thereof. To this end, the pin 7 is attached to one end of an angular supporting element 12, the other arm 12A of which carries a counterweight 13. Two bearing arms 14 and 15, each of which carries two ball bearings or guide rollers 16, are also fixed to the angular supporting element 12. The guiding of these rollers is effected by the guide bar 17, which is a part of the frame 1. As shown in FIGS. 1a and 1b, the frame 1 is suitably extended to the left and carries a supporting knife-edge 18 and a load knife-edge 19. Knife-edge 18 engages with a fixed support 20, while by way of a load stirrup 21 the weight of the load 22 to be weighed is transferred to the load knife-edge 19. Limiting means 23 and 24 are provided for the deflection or swing of the weigh beam, while the arrow 25 indicates the direction of rotation of the roller.

This automatic balance weight beam operates in the following manner. Let the axis of roller 2 be horizontal in the balanced weighing state. The friction wheel 5 is then vertical and the shaft 6 is parallel to the axis of the roller. The guide roller 10 bears on the guide rail 11 through its own weight and a part of the weight of the arm 8. All the parts are at rest, except for the rotation of the roller 2 and the friction wheel 5. If this balanced weighing state is now disturbed, for example, by increasing the load 22 to be weighed, the weigh beam performs an anticlockwise swinging movement about the supporting knife-edge 18 at most as far as permitted by the limiting means 23. The same anticlockwise swing is naturally also performed by the roller 2 mounted on the frame 1. As the guide roller 10 does not change its vertical position, the arm 8 with the shaft 6 and the friction wheel 5 are swung clockwise about the bearing pin 7. A clockwise rotation of the friction wheel 5 with respect to the roller 2 results from these two swinging movements and, because of the inclination between the axis of the wheel 5 and the axis of the roller 2 and the appropriate direction of rotation 25, this produces a shifting of the friction wheel to the right. Of course, all the parts which are connected with the friction wheel 5 are moved at the same time, that is also the arm 8 and the guide roller 10 and the entire supporting device comprising the angular supporting element 12, the counterweight 13, the bearings arms 14 and 15 and the guide rollers 16. The action of all these parts can be equated with that of a compact balance weight. Due to the drive of the constantly rotating roller 2, the shifting to the right takes place until the increased load to be weighed has been balanced afresh, that is the frame 1 has returned to its horizontal starting position. At this moment, the wheel 5 is again perpendicular to the axis of the roller. On a decrease in the load to be weighed 22, reverse conditions occur, so that the structural parts producing the balance weight action are shifted to the left. Since such friction gears can be controlled with very small forces, for example vertically at the guide roller, 50 to 100 mp., and since, furthermore, the running behavior of the friction wheel 5 on the roller 2 is extremely precise and reproducible, the high weighing accuracy of balance weight beams is preserved as a result of the above-described purely mechanical balancing of the load. The reference numeral 32 indicates one end of an indicating rod which extends to a mechanism not illustrated for indicating movement of the supporting element 12 along the guide rail 17, or for actuating the mechanism in response to such movement. FIGS. 1A to 1C show at the same time that this great advantage has been obtained with use of only a few simple parts which, moreover, are also distinguished by high reliability of operation. Furthermore, the weighing time is very short. Even at speeds of only about 300 r.p.m. for the roller 2 and with an angle of swing of the frame of 3 to 4 degrees, adjusting speeds which give running distances or travels of 300 mm. in less than 1 second are obtainable by means of the friction wheel 5. Even if a loss of time for a process of oscillating or swinging into the final balanced state is also taken into consideration, the weighing time is comparable with those of conventional pendulum mechanisms.

Figure 1A:
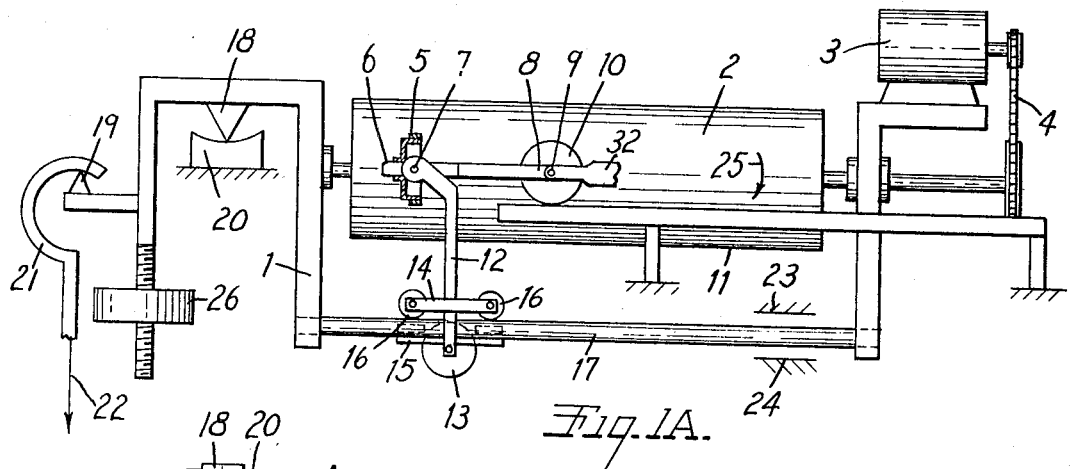
FIG. 1A is a diagrammatic side view of a balance according to the invention.

According to FIG. 1A, a small, substantially vertically adjustable auxiliary weight 26 may, for example, be provided on the frame 1 for damping purposes. In addition to this auxiliary weight, which is generally known in balance manufacture, the novel construction parts which effect the shifting process offer particularly good possibilities for damping the process of swinging or oscillating into the balanced state.

FIG. 2 again shows the parts which are shifted when there is a change in the load 22 to be weighed, that is the parts which collectively constitute the balance weight of the weigh beam. If there is attached to the angular supporting element 12 a spring 27 with jaws 28 and 29, which are advantageously adjustable in their spacing from one another, not only is the free deflection of the arm 8 with respect to the angular supporting element 12 thereby limited, but if the load is increased and the clearance of the jaws is exceeded, part of the weight of the guide roller 10 is brought into the weighing cycle by way of the spring 27. When the load is increased, the limit state is reached when the angle of deflection of the arm 8 with respect to the angular supporting element 12 becomes so large that the spring 27 lifts the guide roller 10 completely away from its guide rail 11. In similar manner, when the load is decreased, a reduction of the balance weight is obtained in that, after the arm 8 has swung anticlockwise with respect of the angular supporting element 12, abutment against the jaw 29 takes place and hence a part of the balance weight is deposited on the rail 11 by way of the guide roller 10. It is particularly advantageous that the stabilizing parts, namely the spring 27 with its jaws 28 and 29, be located in the region of the arm 8 and the annular supporting element 12. By choice of the stiffness of the spring and of the distance between the jaws, adaptation to the most varied conditions of use can be obtained.

FIG. 3 shows another possible simple solution for effecting damping in the region of the structural parts 8 and 12. The parts 5 to 8, 10, 12 and 14 to 16 are again illustrated. To these there is added as stabilizing means a small pendulum piece 30, which is rigidly attached to the arm 8 by means of the rod 31. In the balanced weighing state, the entire weight of the pendulum piece 30, which is then, for example, exactly below the guide roller 10, is transferred by this roller to the guide rail, that is it does not enter into the weighing cycle. If, however, for example, an increase in the load occurs, i.e. the arm 8 swings clockwise, the pendulum piece 30 is shifted to the left with respect to the guide roller 10. It now presses with part of its weight on the pin 7 with a loading action and thus increases the balance weight. If there is a decrease in the load, reverse conditions exist, so that the pendulum piece 30 again has a stabilizing action even in that case. It should also be mentioned that the position of the pendulum piece 30, which position is fixed for constructional reasons, may be fixed differently from the manner illustrated without any change being made thereby in the stabilizing action. If the pendulum piece 30 is located exactly below the bearing pin 7, the guide roller 10 and the guide rail 11 may be completely dispensed with, because the friction wheel 5 is held exactly vertical by the pendulum piece 30. In this case, the operation of the gear is determined solely by the abutment of the weigh beam. However, in this special case, the necessary damping effect of the pendulum piece 30 is detrimental.

Figure 1B:
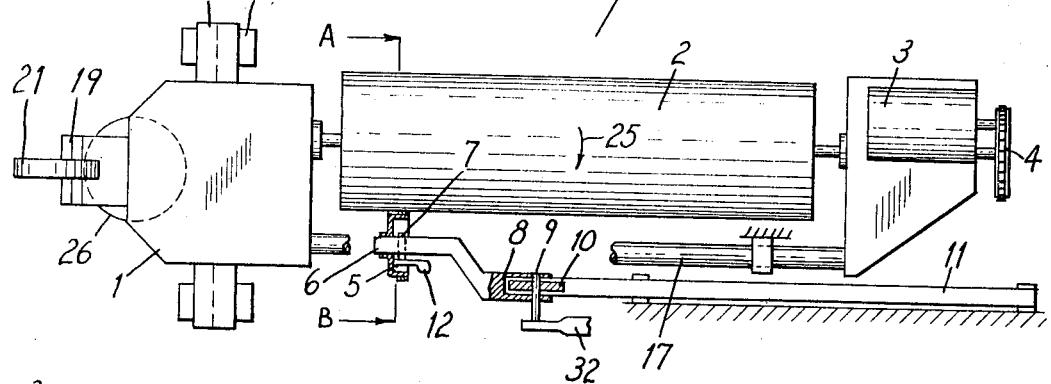
FIG. 1B is a diagrammatic plan view of the balance shown in FIG. 1A.
Figure 1C:
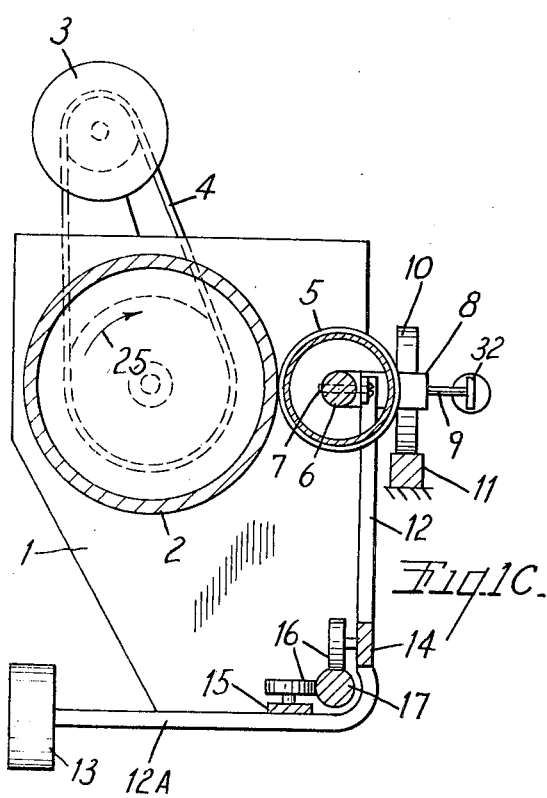
FIG. 1C is a section taken substantially along lines A–B in FIG. 1B.
Figure 4B:
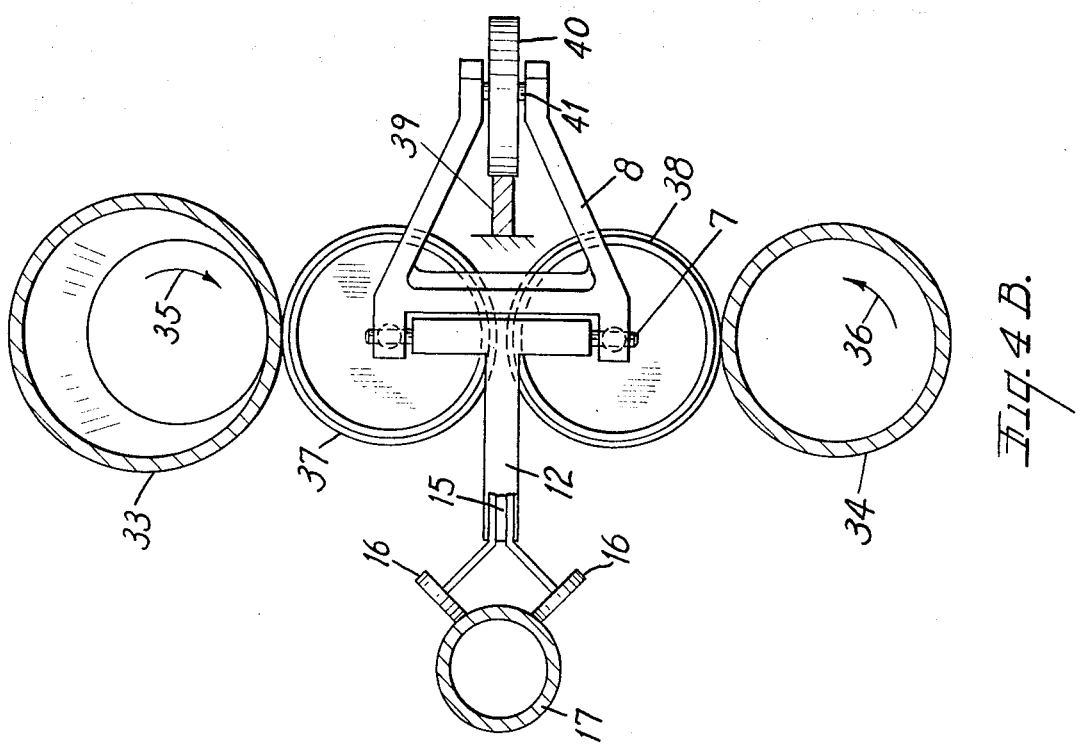
FIG. 4B is an end view mainly in section of computing gear of FIG. 4A are received from the left side of FIG 4A.
Figure 4A:
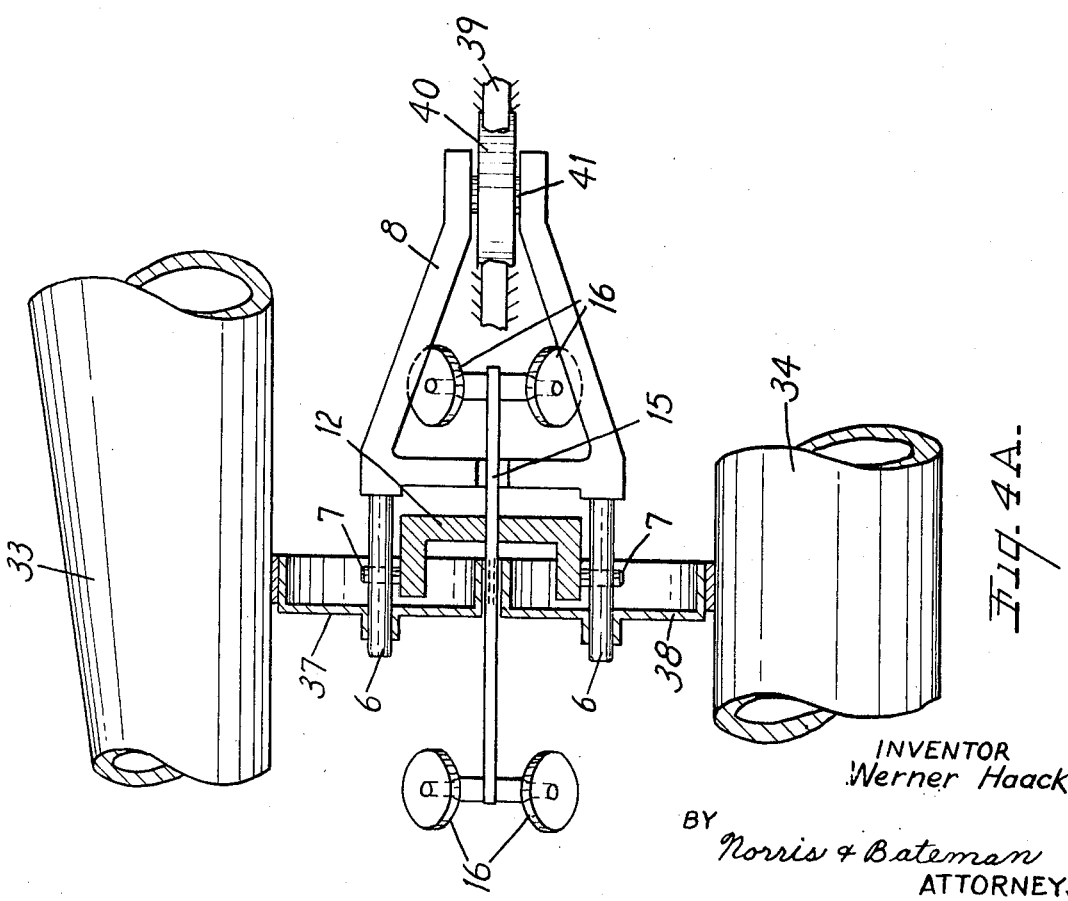
FIG. 4A is a plan view of a computing gear.

FIGS. 4A and 4B show in plan view and section an example of the design of the control parts in a double roller gear. Other parts concerning the weigh beam proper have been omitted, because they correspond to those according to FIGS. 1A to 1C. In accordance with what has been stated hereinbefore, the fact that in FIGS. 4A and 4B the roller 33 is conical and the roller 34 is cylindrical has no special significance as far as the invention is concerned. The direction arrows 35 and 36 show the direction of rotation of the rollers. For the purpose of particularly precise control of the entire gear, there are two friction wheels 37 and 38 between the two rollers, the mounting control and movement of such friction wheels being similar to those of the friction wheel 5 according to FIGS. 1A to 1C. Constructionally, the arrangement of the guide rail 38, along which the guide roller 40 glides, should be noted. Because of the room required for the movement of the friction wheels, the rail cannot in fact be arranged level with the axes of the rollers and friction wheels, so that asymmetry occurs in the control of the friction wheel between an increase in load and a reduction in load.

A suitable guide arrangement for the control point proper 41, by means of which symmetry of control can again be obtained, is shown by way of example in FIG. 5. Here, either two rollers or one roller and two friction wheels or one friction wheel may be employed. In addition to the balance weight parts shifted by the friction wheels, use is made in this arrangement of a control rod 42, one end of which is pivotally connected to the friction wheel control point (referenced 43 in FIG. 5), while the other end can move in a vertical guide 44.

Moreover, a supporting rod 45 is pivotally mounted at a fixed point 47 and is articulated to the control rod 42 at 46. If the control rod 42 has a length twice that of the supporting rod 45 and the point of articulation 46 is located in the middle of the rod 42, such a guide arrangement provides a rectilinear movement for the control point 43. If the fixed point 47 is arranged laterally of the rollers, which is in fact possible without any difficulty, the control point 43 can again be guided symmetrically in this type of construction, and, in fact, in the plane of the centers of the rollers.

Figure 6:
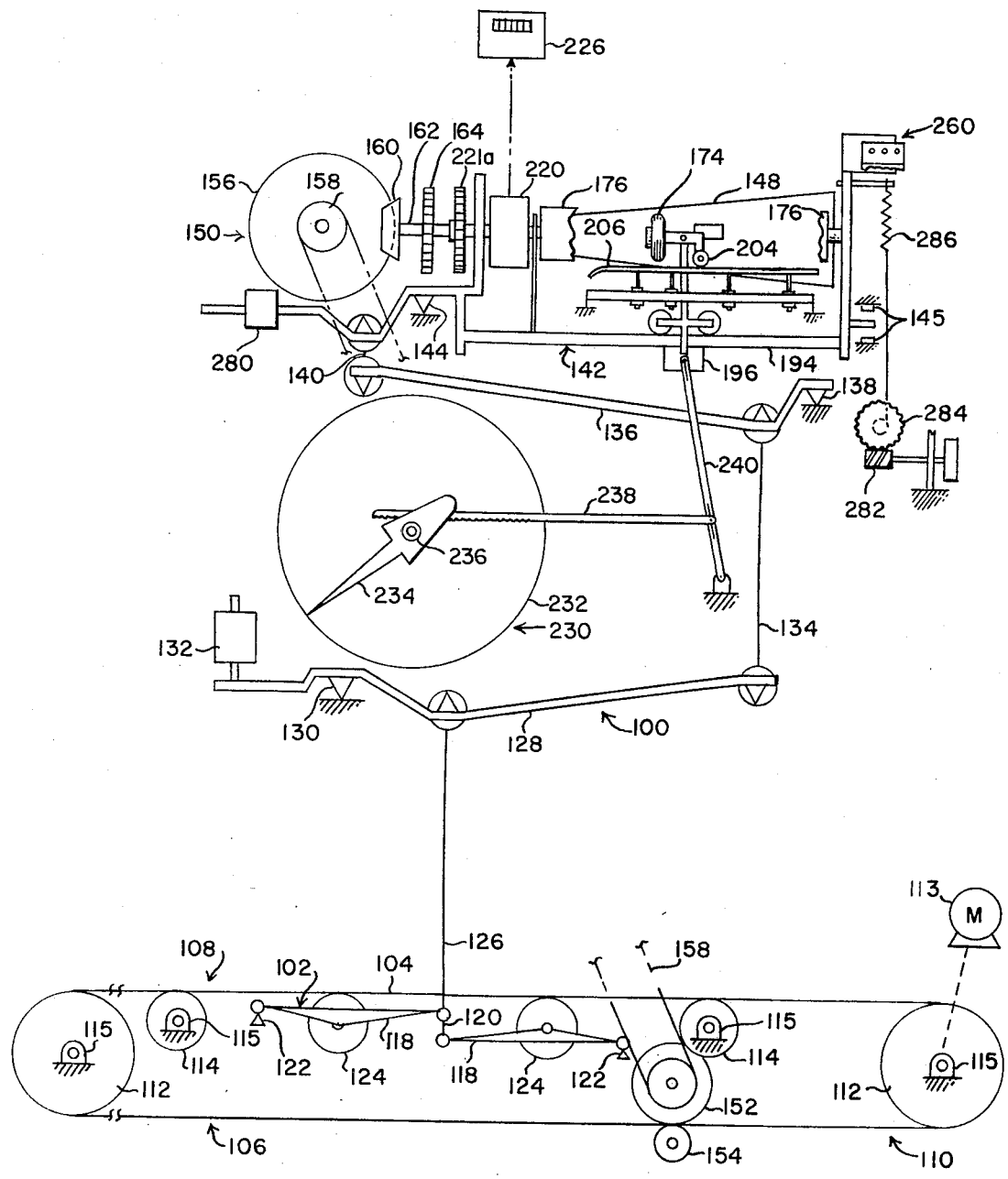
FIG. 6 is a partially diagrammatic side elevation of a further embodiment of this invention.

In the embodiment illustrated in FIG. 6, the beam balancing apparatus of this invention is operatively connected by a motion-transmitting lever system 100 to a displaceable suspension or weighbridge 102 which supports a load-carrying weighing length 104 of an endless conveyor belt 106 in a conveyor scale 108. Scale 106 forms a part of a suitable, conventional conveyor 110 having drive and driven rollers 112 about which belt 106 is trained. A motor 113 of suitable form is drive connected to one of the rollers 112 to advance belt 106. Intermediate idler rollers 114 are provided to support the load-supporting flight of belt 106 at longitudinaly spaced apart regions as shown. Rollers 112 and 114 are rotatably mounted on a fixed frame 115.

Weighbridge 102 suitably comprises a plurality of levers 118 which are connected together at their adjacent ends by a suitable shackle or like structure indicated at 120. The opposite ends of levers 118 are supported for pivotal movement about a fixed fulcrum axis by suitable knife-edge and bearing assemblies indicated at 122. Rotatably mounted on levers 118 are idler rollers 124 which are disposed between rollers 114 and which support the load-carrying weighing length 104 of belt 106. The adjacent, unpivoted ends of levers 118, which are interconnected by shackle 120, are connected by a rod 126 to a lever 128 which forms a part of lever system 100. Belt length 104 constitutes the linear distance from a point midway between the roller pair 115, 124 on one side of shackle 120 to a point midway between the roller pair 115, 124 on the other side of shackle 120.

When a load, such as material, is delivered to belt 106 the weight of the material on the belt weighing length 104 pivots levers 118 in opposite directions to apply a pull to rod 126. In conventional conveyor scales of this type, weighbridge 102 is depressed by a magnitude corersponding to the weight of the applied load. The belt supporting peripheral surfaces of rollers 124 are thus lowered, allowing the belt flight spanning rollers 114 to be depressed by the weight of the material to a level below that shown in FIG. 6. The belt portions engaging rollers 114 consequently flex over the peripheries of rollers 114 with the result that the tension in the belt exerts an upward force component tending to lift the depressed belt portion off of rollers 124. This upward force component therefore has the effect of reducing the downward pull on rod 126 so that the weight that is sensed is reduced by a magnitude corresponding to the magnitude of the upwardly directed belt tension force component. This condition, which exists in prior conveyor scales, is obviously objectionable for if it is not eliminated or otherwise compensated for, it causes inaccuracies in the weight measurement. Frequently, prior conveyor belt scales are so calibrated that with no load on the belt, the belt weighing length 104 is raised above the level shown in FIG. 6, and is only depressed to the level shown in FIG. 6 when a load equivalent to about 50 percent of the scale capacity is applied to the belt weighing length.

When the zero adjusting force is applied to the weighbridge to raise the belt weighing length above the level illustrated in FIG. 6, the load-carrying belt flight will flex about the peripheries of rollers 114 so as to develop a belt tension having a downwardly directed force component tending to pull the belt weighing length down to the level shown in FIG 6. This downwardly directed force is additive to the weight of the load on the belt weighing length so that the sensed weight will consequently be greater than the actual weight.

From the foregoing it is clear that the belt tension variations resulting in either an upwardly directed force component or a downwardly directed force cause objectionable inaccuracies in the weight measurements. The apparatus of this invention, as will become apparent shortly, overcomes the foregoing problem by continually restoring the belt weighing length 104 to the null position shown in FIG. 6 where the weighing length 104 is closely tangential to the peripheries of the belt supporting idlers 114.

With continued reference to FIG. 6, lever 128 is pivoted about a fixed fulcrum axis by a knife-edge and bearing assembly indicated at 130. Lever 128 may be counterweighted as indicated at 132. Lever 128 is connected by a compound knife-edge and bearing assembly 134 to a further lever 136 which is pivoted about a fixed fulcrum axis by a knife-edge and bearing assembly indicated at 138. Lever 136, which forms a part of lever system 100, is, in turn, connected by a compound knife-edge and bearing assembly 140 to the balance beam structure which is indicated at 142.

Beam structure 142 is pivoted about a fixed fulcrum axis by a knife-edge and bearing assembly 144. Closely spaced upper and lower beam stops indicated at 145 limit pivotal motion of beam structure 142 to a relatively small angle in either direction. Thus when the weight of a load applied to the belt weighing length 104 is increased to exert a downward pull on rod 126, lever 128 is pivoted in a clockwise direction (as viewed from FIG. 6) about its fulcrum axis at 130 to exert a downward pull on assembly 134. This force pivots lever 136 in a counterclockwise direction about its axis at 138 to exert a downward pull on assembly 140 for pivoting beam structure 142 in a counterclockwise direction about the pivot axis provided by assembly 144. A counterweight 196 (see FIG. 9) will, as a result, be automatically displaced to rebalance beam structure 142 by the apparatus now to be described in detail.

Figure 8:
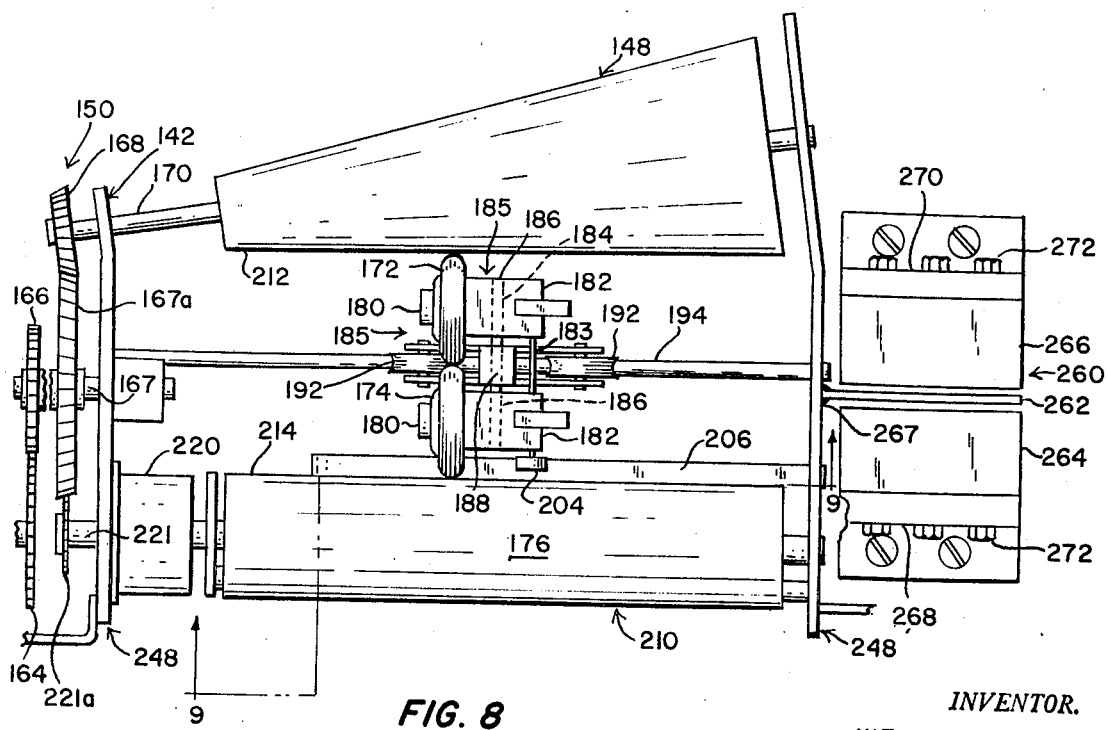
FIG. 8 is a fragmentary, partially diagrammatic plan view of the balance beam and integrator apparatus shown in FIG. 6.

As best shown in FIG. 8, beam structure 142 is of unitary rigid construction and rotatably mounts a roller having a peripheral surface of revolution providing a drive cone 148 in this embodiment. It is clear that the circumferential periphery of cone 148 is contained in a conical envelope. Cone 148 is operatively connected to a drive train 150 (see FIGS. 6 and 8) to be rotated at a speed that is proportional to the linear speed of belt 106.

Drive train 150 comprises a roller 152. Belt 106 is urged toward roller 152 by a further roller 154 so that movement of belt 106 imparts rotation to roller 152. Roller 152 is drive connected to a bevel gear 156 by a belt and pulley assembly 158.

A pinion gear 160 constantly meshing with gear 156 is mounted on a shaft 162. Shaft 162 is rotatably mounted on beam structure 142 and mounts a further gear 164. Gear 164 constantly meshes with a gear 166 which is fixed on a shaft 167. Shaft 167 is journalled on beam structure 142 and mounts a gear 167a which meshes with an upper gear 168. Gear 168 is fixed on a rotatable shaft portion 170 which is fixed to or integral with cone 148. Assembly 158 and gears 156, 160, 162, 164, 166, 167a and 168 all form a part of drive train 150.

As shown in FIG. 8, a pair of frictionally driven wheels 172 and 174 are operatively disposed between cone 148 and a uniformly diametered integrating cylinder 176. Wheels 172 and 174 are in peripheral frictional engagement with each other and respectively peripherally and frictionally engage the peripheries of cone 148 and cylinder 176. Thus, cylinder 176 is rotated by wheel 174, wheel 174 is rotated by wheel 172, and wheel 172 is rotated by cone 148.

Still referring to FIG. 8, each of the friction wheels 172 and 174 is rotatably mounted on a shaft 180 which is supported by a carrier 182. Carriers 182 are rigidly joined together by a pin 183 to form a carriage 185. Carriers 182 are formed with axially aligned bores 184 for rotatably receiving the opposite ends of a cylindrical bearing pin 186. As shown, pin 186 is fixedly mounted on an arm 188 such that the assembly of carriage 185 and friction wheels 172 and 174 is pivotable as a unit about the axis of pin 186 which is perpendicular with respect to the rotational axes of wheels 172 and 174.

Arm 188, as shown in FIG. 9, extends downwardly and has a lower crosspiece 190 which rotatably carries a pair of guide rollers or ball bearings 192. Rollers 192 are peripherally seated on a guide bar 194 which forms a part of weigh beam structure 142. A counterweight or poise weight 196 is secured to an extension 198 which forms a part of arm 188. Additional guide rollers or the like may be provided for guiding counterweight 196 along bar 194 as previously described.

Guide rollers 192 are adapted to travel along bar 194 to guide counterweight 196 longitudinally along bar 194. Bar 194 extends longitudinally of beam structure 142 and at right angles to the pivot axis at 144 so that movement of counterweight 196 in opposite directions along the longitudinal axis of bar 194 varies the lever arm length between counterweight 196 and the pivot axis of beam structure 142. In this manner, the load applied to weighbridge 102 may be counterbalanced.

As best shown in FIG. 9, an arm 202, which is pivotally mounted at its upper end on pin 183, rotatably carries at its lower end a guide roller 204. Roller 204 is seated for movement along a substantially straight, level stationary horizontal guide rail 206. A spring 208 is connected at one end to carriage 185 and is anchored at its opposite end to a suitable surface to bias the assembly of carriage 185 and friction wheels 172 and 174 in a clockwise direction about the axis of bearing pin 186 as viewed from FIG. 9, thus resiliently urging roller 204 into peripheral seating engagement on guide rail 206.

As shown in FIG. 8, the rotational axes of cone 148 and cylinder 176 are contained in a common horizontal plane, and when beam structure 142 is in a null balanced or equilibrium position, the rotational axes of wheels 172 and 174 are also contained in the plane containing the rotational axes of cone 148 and cylinder 176. The rotational axis of cylinder 176 extends longitudinally of beam structure 142 and perpendicularly with respect to the pivot axis of beam structure 142. The rotational axis of cone 148 is inclined at an acute angle relative to the rotational axis of cylinder 176 so that in the plane containing the rotational axes of cylinder 176 and cone 148, the opposing lines defined by the peripheries of cone 148 and cylinder 176 and respectively indicated at 212 and 214 are parallel. The rotational axes of friction wheels 172 and 174 are always perpendicular with respect to the pivot axis of beam structure 142, and when the beam is in its equilibrium position the rotational axes of wheels 172 and 174 lie in the horizontal plane containing the rotational axes of cone 148 and cylinder 176 and the rotational axes of wheels 172 and 174 will be parallel to the rotational axis of cylinder 176. Under these conditions, wheels 172 and 174 will respectively contact cone 148 and cylinder 176 along lines 212 and 214 and a plane normally intersecting the rotational axes of wheels 172 and 174 will perpendicularly intersect the peripheral lines of contact 212 and 214 on cone 148 and cylinder 176 respectively. Thus, when beam structure 142 is in its null balanced or equilibrium position, wheel 172 is at right angles to the peripheral line of contact 212 and wheel 174 extends at right angles to the peripheral line of contact 214.

When beam structure 142 is in a balanced position so that wheels 172 and 174 are perpendicular relative to the lines of contact 212 and 214, or more particularly, so that a plane normally intersecting the rotational axes of wheels 172 and 174 extends perpendicularly with respect to the lines of contact 212 and 214, there will be no force component developed by the frictional engagement of cone 148 with wheel 172 to drive the assembly of wheels 172 and 174 in either direction relative to beam structure 142, cone 148 and cylinder 176. However, when the force applied to weightbridge 102 is varied to pivot beam structure 142 in one direction or the other about its pivot axis at 144, the rotational axes of cone 148 and cylinder 176 will tilt or incline relative to the rotational axes of wheels 172 and 174. By virtue of this pivotal movement of beam structure 142 and by virtue of the fact that roller 204 does not change its vertical position, wheels 172 and 174 will be pivoted relatively about the axis of bearing pin 186 to move away from the perpendicular orientation with respect to lines 212 and 214. Wheels 172 and 174 will thus become inclined at an acute angle relative to lines 212 and 214, and by virtue of this relative inclination between wheel 172 and cone 148 a force component, which is derived from the continued frictional engagement between the peripheries of core 148 and wheel 172, is applied in a direction to rapidly and longitudinally displace the assembly comprising carriage 185 and wheels 172 and 174 longitudinally along guide bar 194 and longitudinally along the peripheries of cone 148 and cylinder 176. By virtue of the connection provided by arm 188, counterweight 196 will be longitudinally displaced along bar 194 as wheels 172 and 174 are longitudinally displaced. The direction of the force developed for longitudinally displacing wheels 172 and 174 is determined by the direction of pivotal movement of beam structure 142 and will be such that it will cause counterweight 196 to move in a counterbalancing direction. Beam structure 142 will therefore then pivot back toward its balanced position and when this position is reached wheels 172 and 174 will resume their perpendicular position relative to lines of contact 212 and 214. Longitudinal displacement of wheels 172 and 174 will then cease to stop the counterbalancing movement of counterweight 196.

If the balanced weighing state is disturbed, for example by increasing the load passing over weighbridge 102, beam structure 142 will pivot in a counterclockwise direction, and the force component which is derived from the frictional engagement between cone 148 and wheel 172, will, under this condition, be directed to displace wheels 172 and 174 toward the larger diametered end of cone 148 to thus longitudinally displace counterweight 196 in a direction for increasing the lever arm length on which counterweight 196 acts to urge beam structure 142 in a re-balancing, clockwise direction. Movement of the assembly of friction wheels 172 and 174 and carrier 185 will be guided by the rolling engagement of guide wheels 204 on guide rail 206 in the same manner as explained in the first embodiment herein.

Weighbridge 102 is initially adjusted by means to be described later on, so that with no load on the weighing belt length, it will be at a null position where belt length 104 is preferably level and substantially tangential with respect to rollers 114 as shown in FIG. 6. When an increase in the momentary or instantaneous load passing over conveyor belt 106 is sensed by the suspension provided by weighbridge 102, the resulting pivotal displacement of levers 118 is transmitted substantially immediately by lever system 100 to pivotally displace beam structure 142 in a counterclockwise direction.

As soon as beam structure 142 begins to pivot in a counterclockwise direction, the resulting change in the inclination of cone 148 relative to the rotational axis of friction wheel 172 immediately provides the needed force component for driving the assembly of friction wheels 172 and 174, carriers 182 and counterweight 196 toward the larger diametered end of cone 148 as previously described. Thus, friction wheels 172 and 174 begin to move longitudinally to restore the apparatus to its null balanced state substantially as soon as weighbridge 102 is displaced by the change in the sensed weight of the load. The time lag between the time that the weighing belt length 104 is flexed away from its null position by a change in the sensed weight of the travelling load and the time that it is restored to its null position by the longitudinal displacement of friction wheels 172 and 174 is so small that any weighing inaccuracies occurring during this period will be negligible. Furthermore, weighbridge 102 and the belt weighing length will be displaced only a very small distance away from their null positions before corrective action takes place to restore the weighbridge and the weighing belt length to their null positions. As a result, the magnitude and duration of belt tension variations are so small that weight measurement inaccuracies attributable to such variations are negligible.

When the weight of the momentary load passing over the suspended portion of belt 106 is decreased, the resulting momentary unbalance causes beam structure 142 to pivot in a clockwise direction about its pivot axis at 144. The rotational axis of cone 148 will therefore incline relative to the rotational axes of wheels 172 and 174, but in a direction that is opposite to that which occurred when the weight of the load passing over the conveyor belt 106 was increased. By virtue of relatively moving wheel 172 away from its perpendicular orientation with respect to the line of contact 212 on cone 148, a longitudinal force component is again developed by the frictional engagement of wheel 172 with cone 148, but this force component will now be in a direction to drive the assembly of wheels 172 and 174, carriers 182 and counterweight 196 longitudinally toward the smaller diametered end of cone 148.

As best shown in FIG. 8, cone 148, wheels 172 and 174, and cylinder 176 constitute a mechanical computing mechanism 210 for multiplying two inputs which are respectively representative of the conveyor belt speed and the instantaneous weight of material sensed by weighbridge 102 to provide an output at cylinder 176 which represents the feed rate (in terms of weight per unit time) of the material passing over the weighbridge.

In this embodiment, the configuration of cone 148 is important to effect a variation in the rotational speed of friction wheel 172 in accordance with the distance that wheel 172 is displaced from the pivot axis of beam structure 142. Cone 148, it will be recalled, rotates at a speed accurately proportional to the linear speed of belt 106 since it is driven from belt 106. The angular velocity of wheel 172, however, will depend upon the diameter of the cone periphery engaged by wheel 172, and the diameter of cone 148, of course, varies uniformly throughout its length. The angular velocity of wheel 172 is therefore proportional to the diameter of the cone periphery which wheel 172 engages. The peripheral region of cone 148 which is engaged by wheel 172 is, in turn, determined by the longitudinal distance at which wheel 172 is positioned from the pivot axis of beam structure 142. This longitudinal distance at which wheel 172 is positioned from the pivot axis of beam structure 142 will be representative of the instantaneous weight of the travelling load sensed at weighbridge 102 when wheel 172 is in its null balanced position. Therefore the angular velocity of wheel 172 will be a function of the distance at which it is displaced from the pivot axis of beam structure 142 and consequently, the weight of the sensed load per unit length of belt 106, as well as being a function of the linear speed of the conveyor belt.

By moving wheel 172 toward the larger diametered end of cone 148 as the sensed weight increases and toward the smaller diametered end of cone 148 as the sensed weight decreases, the angular velocity of wheel 172 will change by a magnitude corresponding to the change in the sensed weight. Accordingly, the angular velocity of wheel 172 is representative of the feed rate at which material is passing over the conveyor belt 106. This rotational velocity is imparted through wheel 174 to rotate cylinder 176 at a proportional velocity.

Since the smaller end of cone 148 is formed with a finite diameter there is in effect no physically zero position at which wheel 172 may be located to rotate at a velocity which is proportional to the speed of belt 106. Consequently a zero offset mechanism in the form of a differential gear assembly 220 is provided to obtain an output which is directly proportional to the feed rate at which material is passing over conveyor belt 106 in a given time period. One input of differential 220 is a gear 220a fixed on a shaft 221, driven by a gear 221a and journalled on structure 142. Gear 221a constantly meshes with gear 167a as shown in FIG. 8. Shaft 221 thus rotates at a velocity proportional to the speed of belt 106. A second shaft 222 which is fixed to cylinder 176 is connected to the other input of differential 220. This other input as shown in FIG. 8A comprises a carrier 223 rigid with shaft 222 and rotatably mounting a compound planet gear 224 meshed with both gear 220a and a gear 225 rotatably about shaft 221. Gear 225 in turn is fixed to an output gear 226' meshed with a suitable output train indicated at 226''. The output of differential 220, which represents the difference between the two input velocities, is connected by any suitable means such as 226'' to the input of a totalizing counter which is indicated at 226 in FIGS. 6 and 11. The output of differential will therefore be directly proportional to the feed rate of material so as to drive counter for totalizing the weight passing over belt 106.

In addition to counter 226, a dial mechanism 230 (see FIG. 6) may be provided for and comprises a suitable dial indicated at 232 and associated indicator 234 which is mounted on a rotatable shaft 236. An unshown pinion gear is also mounted on shaft 236 and constantly meshes with a rack 238 which is pivotally connected to a suitable linkage 240. One end of linkage 240 is pivotally connected to a support surface and the other end of linkage 240 is suitable pivotally connected to counterweight 196. Since counterweight 196 is positioned at a distance from the pivotal axis of beam structure 142 which is proportional to the instantaneous load sensed by weighbridge 102, indicator 234 will be driven through the motion-transmitting connections provided by linkage 240 and rack 238 to indicate the momentary load.

Figure 7:
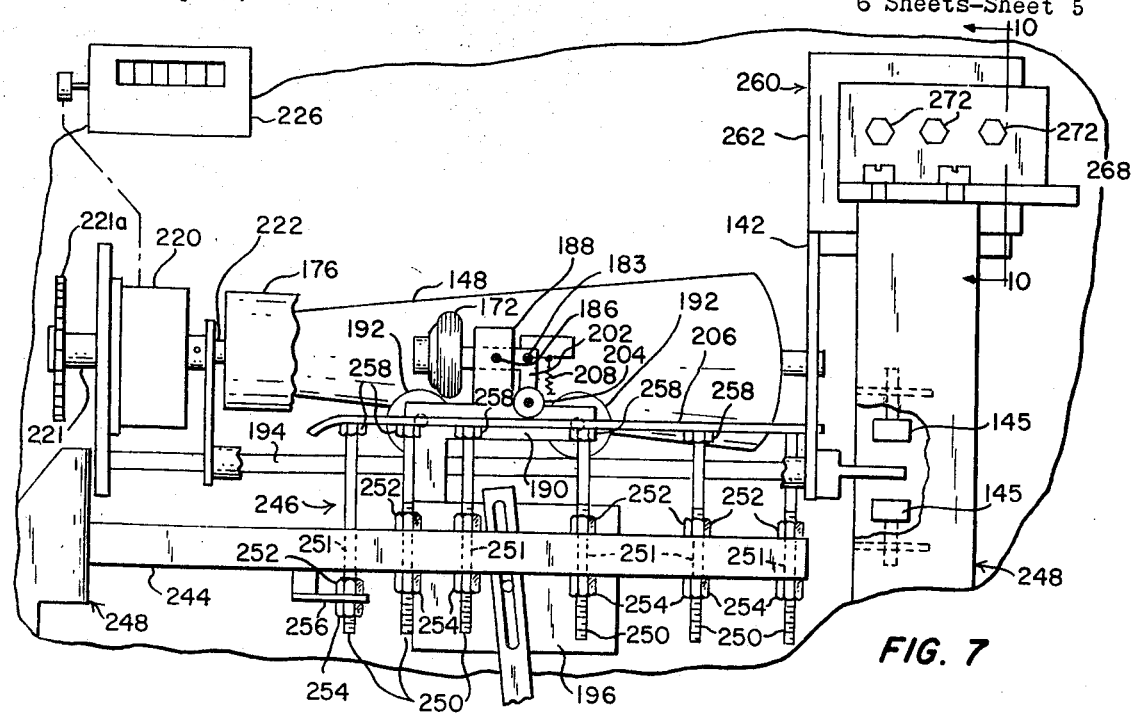
FIG. 7 is an enlarged fragmentary elevation of the linearized null adjustment shown in FIG. 6.

As best shown in FIG. 7, guide rail 206 is mounted on a rigid horizontally extending bar 244 by a null adjustment assembly 246. Bar 244 is fixed to a suitable rigid frame 248 which pivotally support beam structure 142. Assembly 246 comprises a series of rods 250 which are threaded at both ends. The lower ends of rods 250 slidably extend through parallel spaced apart smooth wall bores 251 which are formed through bar 244. These lower ends of rods 250 are threaded into nuts 252 and 254 as shown. With the exception of the nuts threaded on the left most rod in FIG. 7, nuts 252 and 254 are respectively fixed to the upwardly facing and downwardly facing surfaces of bar 244 by any suitable means. The nuts 252 and 254 for the left-most rod 250 are respectively fixed to the top side and underside of an arm 256 through which the left-most rod 250 slidably extends. Arm 256 is fixed to bar 244 by any suitable means. The upper end of rods 250 are threaded into nuts 258 which are fixed to the underside of guide rail 206 in axial alignment with the bores 251 formed through bar 244.

As shown, the longitudinal axes of rods 250 are in parallel spaced apart relation to each other and extend vertically to substantially perpendicularly intersect the upper, smooth, flat surface of guide rail 206 on which roller 204 is seated. Preferably the axes of rods 250 are contained in a common plane substantially medially intersecting the roller-engaging surface of rail 206.

With the foregoing construction of assembly 246, it will be appreciated that rods 250 are vertically displaceable independently of each other by turning nuts 252 and 254 in directions to cause rods 250 to be threaded either in an upward or a downward direction.

By vertically displacing one of the rods 250 in the foregoing manner while maintaining the nuts 252 and 254 on the remaining rods 250 tightly threaded to fix the remaining rods 250 against vertical displacement, it is evident that the portion of guide rail 206 in the immediate region of the vertically displaced rod 250 is raised or lowered as the associated rod 250 is vertically raised or lowered. For this purpose guide rail 206 is so constructed as to enable sections of it to be flexed through small distances by vertical displacement of rods 250.

If, for example, the second rod 250 from the right (as viewed from FIG. 7) is vertically displaced downwardly while maintaining the remaining rods 250 fixed against vertical displacement, the portion of the guide rail 206 extending between the right-most rod 250 and the third rod from the right will be flexed downwardly to lower the level of the top roller engaging surface of rail 206 extending between the right-most rod 250 and the third rod from the right without changing the level of the remainder of the roller-engaging, guide rail surface.

When wheels 172 and 174 are now advanced to a position where roller 204 moves over the downwardly displaced portion of guide rail 206 in the region of the adjusted rod 250, the assembly of wheels 172 and 174 and carriers 182 will pivot about the axis of bearing pin 186 to adjust the angular orientation of wheels 172 and 174 relative to the peripheral lines of contact 212 and 214 on cone 148 and cylinder 176 respectively.

Rods 250 are spaced horizontally apart at preselected distances so that their longitudinal axes intersect the roller-engaging surface of guide rail 206 at points corresponding to the predetermined increments of the capacity of the conveyor belt scale. For example, the rods extending from right to left may be mounted at points respectively corresponding to full scale capacity, three quarters of the scale capacity, one half of the scale capacity, one quarter of the scale capacity, one eighth of the scale capacity, and zero scale capacity.

Rods 250 are adjusted to compensate for irregularities in the roller engaging surface of rail 206 or other manufacturing imperfections which cause wheels 172 and 174 to non-linearly deviate from their true null balanced positions at different loads within the range of the scale. The null adjustment may be accomplished after the scale is tared by applying to weighbridge 102 a load whose known weight is equal to the value that corresponds to one of the incremental positions of rods 250. For example, the known weight applied to weighbridge may be equal to the full capacity of the scale which may be 5000 pounds. If counter 226 does not register 5000 pounds, then the right-most rod 250 (as viewed from FIG. 7) is adjusted in a direction corresponding to the deviation of the counter read-out until the counter registration equals the known weight on the weighbridge. Adjustment of rod 250 will pivot the assembly of wheels 172 and 174 about the axis of bearing pin 186 so that they will be longitudinally advanced to a new null balanced position where they are effective to provide registration on counter 226 that equals the known weight of applied to weighbridge 102, and if the counter does not corresponding to the position of the next rod 250 (three-fourths of the scale capacity in this embodiment) is applied to weighbridge 102, and if the counter does not register the true weight value, the second rod from the right (as viewed from FIG. 7) is adjusted in a direction corresponding to the deviation. This operation is repeated for each rod by placing on the scale a known weight corresponding to the position of the adjusting rod.

By providing for a sufficient number of closely spaced rods 250 as in this embodiment a linearization of the null balanced state of wheels 172 and 174 is effectively approximated with respect to the entire weighing range of the scale. It will be appreciated that adjustment of the null balanced positions of wheels 172 and 174 for each weight increment associated with rods 250 results in the adjustment of the null position of the belt weighing length 104.

Normally each section of the roller engaging surface of rail 206 is vertically adjusted so that the entire effective length of the guide rail surface between zero and full capacity lies in a common plane that is parallel to the plane containing the rotational axes of cylinder 176 and cone 148.

As best shown in FIGS. 8 and 10, an eddy current damping device 260 is provided for beam structure 142 and comprises a flat-sided relatively rigid thin cross-sectioned plate 262 and a pair of permanent magnets 264 and 266 of horseshoe configuration. Plate 262 is formed from a suitable electrically conductive material, such as copper. Magnets 264 and 266 are mounted in opposed mirror image relation respectively on rigid posts 268 and 270 by suitable means such as screws indicated at 272. Posts 268 and 270 form a part of frame 248.

The North and South poles of magnet 264 oppose and are aligned with the North and South poles of magnet 266. The pole faces of magnets 264 and 266 are contained in parallel spaced apart planes which are preferably vertical and extend at right angles to the pivot axis of beam structure 142. The opposed pole faces of magnets 264 and 266 are spaced apart as shown to provide a space into which plate 262 extends.

Plate 262 is fixed on beam structure 142 by any suitable means indicated at 267 so that its flat sides extend in planes parallel to the planes containing the pole faces of magnets 264 and 266. Plate 262 will move in an arcuate path that is contained in a plane extending parallel to and spaced between the planes containing the pole faces of magnets 264 and 266.

As beam structure 142 is pivoted in either direction, it will be appreciated that plate 262 perpendicularly cuts the lines of flux in the magnetic field between the poles of magnets 264 and 266. Since plate 262 is electrically conductive a voltage will be induced in plate 262 by virtue of cutting these lines of flux to thus cause eddy currents to flow in plate 262. The eddy currents flowing in plates 262 will create a force or more particularly a magnetic field which is in opposition to the magnetic field which induced the eddy current flow in the plate, and which will cause a current to flow in plate 262 in opposition to the eddy current flow. The opposing force according to Lenz's law, will oppose the motion of a conductor through a magnetic field and in this case acts as a side thrust on plate 262 to oppose the pivotal motion of beam structure 142.

Thus, the force applied to plate 262 in opposing the motion of plate 262 through the magnetic field between magnets 264 and 266, dampens the pivotal motion of beam structure 142. This opposing force will be a function of the opposing current in plate 262, and this opposing current will be a function of the flux density of the magnetic field, the loop resistance to current flow in plate 262, and the velocity of plate 262 travelling through the magnetic field. By increasing any one or more of these factors the opposing current and, consequently, the opposing force will be increased. Correspondingly, decreasing any one or more of these factors decreases the opposing current and, consequently, the opposing force. It therefore will be appreciated that the damping force applied to beam structure 142 will increase and decrease respectively as the velocity at which beam structure 142 is pivoted is increased and decreased.

The scale described herein may be tared by coarse and fine adjustments. The coarse adjustment is afforded by adding or removing weights to a counterweight assembly that is indicated at 280 in FIG. 6 to coarsely tare out the dead load applied to beam structure 142. The fine adjustment is effected by selectively turning a gear 282 (FIG. 6) which meshes with another gear 284 for adjusting the tension in a suitable spring 286 that is connected between gear 284 and beam structure 142.

The foregoing fine adjustment is an important feature in that tension spring 286 provides a force that insures rolling contact between guide roller 204 and the stationary guide track 206 in the balanced condition of the beam structure. This makes it impossible for the beam structure 142 to balance except in the calibrated position.

It will be appreciated that weighbridge 102 may be of any suitable form to provide a platform-like support for the weighing length of belt 106.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an automatic weighing scale having a weighing beam supported on a fixed pivot and having a load arm extending to the opposite side of the pivot from the beam, the improvement which comprises: a roller rotatably mounted on said beam and extending longitudinally thereof, a motor mounted on said beam and connected to rotate said roller, a guide rail fixedly connected to said beam in parallel relation to the axis of said roller, a supporting element constituting part of a balance weight freely movable along and supported by the guide rail, a generally horizontal movable pivot connected to said supporting element and extending transversely with respect to the axis of said roller, a shaft tiltably mounted on said movable pivot to swing about the axis of the movable pivot, a friction wheel rotatably mounted on said shaft and having its periphery in frictional driven engagement with the surface of said roller, a lever arm rigidly connected to said shaft and extending longitudinally with respect to the shaft from said movable pivot, means forming a control surface on said lever arm in spaced relation to said movable pivot, and a fixed part forming an elongated surface extending longitudinally with respect to said roller and with which said control surface is engageable and movable along as said supporting element is moved along said guide rail by said friction wheel.

2. A scale as defined in claim 1 in which said beam comprises a frame on which said roller and said guide rail are mounted with the guide rail exterior to said roller, said roller and said guide rail being in side by side relation and located on the opposite side of said fixed pivot from said lever arm and said friction wheel being engaged with the exterior surface of said roller.

3. A weighing scale as defined in claim 1 in which there is a dampening means arranged to supply a retarding force against turning of said shaft and said lever arm about said movable pivot.

4. Weighing apparatus as defined in claim 1 in which there is an indicating member connected to said supporting element and movable thereby to transmit an indication of the direction and extent of movement of the supporting element along said guide rail.

5. A weighing scale as defined in claim 1 in which said frame has two rollers mounted thereon in spaced side by side position, said guide rail being parallel to the axis of one of said rollers, a pair of shafts pivotally mounted on said supporting element and connected in spaced relation between said rollers, and a pair of friction wheels mounted one on each shaft and frictionally engaged with said rollers, said lever arm being connected in rigid relation and extending from said pair of shafts.

6. In a weighing apparatus having a load-supporting, pivotally mounted weigh beam structure and a poise weight movably mounted on said structure, the improvement comprising a member mounted for rotation and for displacement longitudinally along its rotational axis, and means frictionally engaging said member for imparting rotation thereto, said rotation-imparting means being operable through its frictional engagement with said member for longitudinally displacing said member along its rotational axis upon pivotal movement of said beam structure away from an equilibrium position, said poise weight being operatively connected to said member to displaced by the longitudinal displacement of said member for poising said beam structure.

7. Weighing apparatus comprising a pivoted weigh beam structure, means for applying a load to be weighed to said structure, counterweight means mounted for movement relative to said structure, and means for automatically displacing said counterweight means in a direction to counterbalance a change in weight of said load comprising a drive member mounted on said structure for rotation about an axis, means for continually rotating said drive member about said axis, and means operably connected between said drive member and said counterweight means responsive to a change in attitude of said drive axis for automatically displacing said counterweight means in the counterbalancing direction.

8. Weighing apparatus comprising a pivoted weigh beam structure, means for applying a load to be weighed to said structure, counterweight means mounted for movement relative to said structure, and means for automatically displacing said counterweight means to counterbalance a change in weight of said load comprising a drive member mounted on said structure for rotation about an axis and having a surface of revolution symmetrical about said axis, means for continually rotating said drive member about said axis, and means operably connected to said surface and responsive to a change in attitude of said drive axis as the weigh beam structure pivots due to said change in weight for displacing said counterweight means in the counterbalancing direction.

9. In the weighing apparatus defined in claim 8, said means operably connecting the counterweight means to said surface comprising a roller frictionally engaged with said surface and mounted for rotation about an axis that has a predetermined angular relation to the drive member axis when the weight beam structure is balanced and is differently angularly related to said drive member axis when the weigh beam structure is unbalanced.

10. In the weighing apparatus defined in claim 9, means defining a pivot structure on which said roller is mounted to permit variation of the angularity between its axis and that of the drive member, mechanism mounting said pivot structure, and a stationary slide guide on which said mechanism is mounted for displacement substantialy longitudinally of said drive member.

11. In the weighing apparatus defined in claim 10, said mechanism slidable on said guide comprising an arm mounting said pivot structure, and means providing free rolling engagement between said arm and said guide.

12. In the weighing apparatus defined in claim 11, a counterweight on said weigh beam structure providing a relatively coarse balance for the weight of the drive member, roller and counterweight means on said weigh beam structure, and adjustable resilient means providing a further and fine adjustment to balance said weight when the weigh beam is in horizontal balanced position.

13. In the weighing apparatus defined in claim 11, resilient means biasing said weigh beam structure to insure said rolling engagement between the arm and guide when the weigh beam structure is balanced.

14. In the weighing apparatus defined in claim 10, means connected to said mechanism for operating an indicator showing the weight of said load.

15. Weighing apparatus as defined in claim 9 wherein said surface is conical, and said axes are disposed at a predetermined acute angle when the weigh beam structure is balanced.

16. Weighing apparatus as defined in claim 9, wherein said surface is cylindrical and said axes are parallel when the weigh beam structure is balanced.

17. In the weighing apparatus defined in claim 8, said means operably connected to said surface comprising a freely rotatable roller having its periphery frictionally engaged with the surface of said drive member, a shaft on which said roller is mounted for rotation about an axis disposed at a known angle to said drive axis when the weigh beam structure is balanced, mechanism on which said shaft is swingably mounted to vary the relative angularity of said drive and roller axes, and a stationary slide guide mounting said mechanism for maintaining said roller axis against angular displacement, whereby when said weigh beam structure is unbalanced due to a change in the weight of the load and said drive axis changes its attitude to incline said surface relative to said roller periphery a force component derived from rotation of said drive member displaces said roller and said counterweight means in the counterbalancing direction until the load weight is balanced and said weigh beam counter structure pivots back to its initial balanced position and said axes regain said known relative angularity.

18. In a weighing apparatus, a pivotally mounted weigh beam structure, means for applying a load to be weighed to said beam structure, a counterweight movably mounted on said beam structure for counterbalancing the weight of the load applied to said structaure, a drive member rotatable about a predetermined axis, drive means for continuously rotating said drive member, a driven member supported for rotation about a further axis and frictionally engaging the peripheral surface of said drive member to be rotated about said further axis by said drive member, said drive member being carried by said beam structure to incline relative to said driven member as said structure is pivoted away from a balanced position to impart a force derived from its rotative engagement with said drive member for displacing said driven member in a predetermined direction longitudinally along said peripheral surface, and said counterweight being connected to said driven member to be displaced in a beam structure balancing direction by the longitudinal displacement of said driven member.

19. In a weighing apparatus a load-supporting, pivotally mounted balance beam structure, a counterweight positionable on said beam structure to counterbalance a load applied thereto, a drive member mounted for rotation on said beam structure, means for continuously rotating said drive member, and rotatably mounted means operatively connected to said counterweight and being in coacting driven engagement with said drive member for displacing said counterweight in a load-balancing direction along said structure in response to pivotal movement of said structure away from a balanced position.

References Cited

UNITED STATES PATENTS

| | | | |
|---|---|---|---|
| Re. 16,666 | 7/1927 | Hebden | 177—214 |
| 1,519,383 | 12/1924 | Merrick | 177—212 |
| 1,980,956 | 11/1934 | Okey | 177—249 |

FOREIGN PATENTS 196,527  4/1923  Great Britain.

ROBERT S. WARD, JR., Primary Examiner

U.S. Cl. X.R.
177—16, 185

UNITED STATES PATENT OFFICE
CERTIFICATE OF CORRECTION

Patent No. 3,512,596　　　　　　　　Dated May 19, 1970

Inventor(s)　　　W. Haack

It is certified that error appears in the above-identified patent and that said Letters Patent are hereby corrected as shown below:

```
Column 1, line 62, "weight" should be --weigh--.
Column 4, line 2, insert a comma (,) after "mechanically".
Column 11, line 23, "core" should be --cone--.
Column 14, line 61, after "provide" insert --a--.
Column 14, delete line 63 and insert --the load on
        weighbridge 102.  Then a known weight--.
Column 17, lines 56-57, Claim 10, "substantialy" should be
        --substantially--.
Column 18, line 32, Claim 18, "structaure" should be
        --structure--.
```

SIGNED AND SEALED
OCT 13 1970

(SEAL)
Attest:

Edward M. Fletcher, Jr.
Attesting Officer

WILLIAM E. SCHUYLER, JR.
Commissioner of Patents